United States Patent [19]

Boettcher

[11] 4,404,958

[45] Sep. 20, 1983

[54] SOLAR ENERGY COLLECTOR, AND WATER HEATER AND HEATING DEVICE WITH A HEAT PUMP CONTAINING THE SAID COLLECTOR

[75] Inventor: Alfred Boettcher, Hangstrasse 11, 51 Aachen, Allemagne, Fed. Rep. of Germany

[73] Assignee: Alfred Boettcher, Aachen, Fed. Rep. of Germany

[21] Appl. No.: 168,672

[22] Filed: Jul. 14, 1980

[30] Foreign Application Priority Data

Jul. 19, 1979 [DE] Fed. Rep. of Germany ....... 2929162
Nov. 28, 1979 [DE] Fed. Rep. of Germany ....... 2947877
Feb. 13, 1980 [DE] Fed. Rep. of Germany ....... 3005253

[51] Int. Cl.³ .................................................. F24J 3/02
[52] U.S. Cl. .................................... 126/426; 126/435; 126/444; 126/445; 126/450
[58] Field of Search ................ 126/426, 435, 427, 450, 126/444, 445; 34/93

[56] References Cited

U.S. PATENT DOCUMENTS

| | | | |
|---|---|---|---|
| 659,450 | 10/1900 | McHenry | 126/435 X |
| 3,513,828 | 5/1970 | Masters | 126/426 |
| 3,908,631 | 9/1975 | Rom | 126/426 |
| 3,949,095 | 4/1976 | Pelehach et al. | 126/426 X |
| 4,026,268 | 5/1977 | Bartos et al. | 126/270 |
| 4,031,674 | 6/1977 | Rand | 126/426 X |
| 4,036,209 | 7/1977 | Press | 126/426 X |
| 4,054,124 | 10/1977 | Knoos | 126/435 |
| 4,096,850 | 6/1978 | Hadcroft | 126/271 |
| 4,120,286 | 10/1978 | Farber | 126/271 |
| 4,126,270 | 11/1978 | Hummel | 237/1 A |
| 4,151,830 | 5/1979 | Crombie et al. | 126/426 |
| 4,160,443 | 7/1979 | Brindle | 126/426 |
| 4,182,307 | 1/1980 | Brindle et al. | 126/432 |
| 4,203,420 | 5/1980 | Schoenfelder | 34/93 X |
| 4,203,425 | 5/1980 | Clark | 126/426 |

FOREIGN PATENT DOCUMENTS

2351364 12/1977 France .
1161887 8/1969 United Kingdom .
W079/00225 5/1979 World Intel. Prop. Org. .

Primary Examiner—Larry Jones
Attorney, Agent, or Firm—Burns, Doane, Swecker & Mathis

[57] ABSTRACT

A solar energy collector comprises plastic sheets superposed to delimit a tube for circulation of a gas to be heated by contact with radiant heat absorbing means in the collector, and an insulating chamber communicated with the tube by means of at least one aperture. Separate inflation means for the insulation chamber is not needed as the heat transfer gas inflates both the tube and the insulation chamber, rendering the collector less liable to damage by overheating upon deflation of the tube.

15 Claims, 16 Drawing Figures

SOLAR ENERGY COLLECTOR, AND WATER HEATER AND HEATING DEVICE WITH A HEAT PUMP CONTAINING THE SAID COLLECTOR

The present invention relates to an improved solar energy collector of the inflatable type for heating a gaseous fluid, in particular for heating air. The invention also relates to a water heater and a pump assisted heating device containing the said collector.

The heating of air by means of solar energy has frequently been achieved using solar collectors similar to those used for heating a liquid heat-transfer fluid, that is to say the solar collectors consist of an absorbing element placed in a rigid box containing a transparent wall and have a gaseous fluid circulating in contact with the absorbing element. Although this type of collector is satisfactory for heating air, these collectors are not easy to handle because they are rigid, heavy and bulky.

The difficult handling of collectors of this type is troublesome because the solar energy collectors intended for heating air are frequently used in a mobile residence, for example either for domestic heating or in association with an air/water exchanger for the production of hot water. The solar collectors intended for heating air are also frequently used in the field of agriculture, for example for drying fodder and grain, the storage locations of these products frequently being far apart from one another on a farm.

A solar collector intended for heating air was then produced, which was easy to move because it could be rolled up for transportation.

A collector of this type generally comprises an inflatable tube formed of two dark-coloured plastic sheets joined together in a leaktight manner along their periphery to leave an inlet and an outlet for the air. This tube acts as a heat-absorbing element. To improve the efficiency of these collectors, the inflatable tube is thermally insulated by means of an inflatable outer envelope trapping a layer of air. The inflatable envelope is delimited by on the one hand a plastic sheet which is permeable to solar radiation and on the other hand one wall of the dark-coloured tube, the enevelope acting as an insulation chamber. The inner tube and the insulating enevelope are insulated from one another.

The air to be heated is introduced into the inner tube by means of a fan. The inflatable envelope can be inflated with the aid of a second fan or a compressed air supply.

Although this embodiment of a solar collector formed of plastic sheets is more or less satisfactory, its operation presents two main difficulties.

The first difficulty arises when there is a large difference between the pressure of the air in the envelope and the pressure of the air in the inner tube. On the one hand, if the pressure of the air in the envelope is much lower than the pressure of the air in the inner tube the cross-section of the envelope will be smaller, whereupon the thermal insulation of the inner tube is no longer so effective and the efficiency of the collector decreases. If, on the other hand, the pressure of the air in the inner tube is much lower than the pressure of the air in the insulating envelope the passage area for the air to be heated in the inner tube decreases and the air flow is hindered, causing a decrease in the flow rate and leading to risks of overheating.

Thus, for collectors in which the air flow rate undergoes significant variations, it is necessary to provide regulation and/or control and/or safety systems.

The second difficulty arises when the circulation of the air to be heated is intentionally or accidentally stopped, even in the case of very low air flow rates. If the air flow rate is very low or even zero then, on the one hand, the heat absorbed by the inner tube is no longer discharged via the air and, on the other hand, the inflatable envelope prevents heat losses from the inner tube to the outside and thus prevents the inner tube from cooling. The solar collector which is made of plastic sheets of relatively poor ability to withstand the effects of heat thus runs the risk of being damaged by overheating.

Accordingly the present invention provides in a solar energy collector for heating a gaseous fluid, said collector consisting of at least three plastic sheets joined together so as to delimit a tube having inlet and outlet means for the circulation of a gaseous heat transfer fluid, and an insulation chamber, and wherein at least that sheet which constitutes the external wall of the said chamber is permeable to solar radiation, the improvement comprising:

means in contact with the said gaseous fluid and effective for absorbing solar energy;

means communicating said insulation chamber with said tube for the circulation of fluid; and means for fixing the said collector to a support surface.

It is an object of the present invention to provide a solar energy collector of simple and economical construction, which can easily be transported and moved.

To delimit the tube for the circulation of fluid, two of the plastic sheets are joined together in a leaktight manner along their periphery, and inlet and outlet openings for the fluid are provided between the two plastic sheets, that is to say in the tube. The inlet and outlet means for the gaseous fluid can consist of tubular sleeves welded or stuck to the periphery of the openings.

To delimit the insulation chamber, the sheet constituting the external wall of the chamber is joined along its whole periphery, in a leaktight manner, to one of the sheets delimiting the tube.

Preferably, the solar energy collector according to the present invention consists of plastic sheets of similar dimensions, in the shape of an elongate rectangle, with the shorter side at each end of the rectangle joined to the longer base of a respective one of two isosceles trapezium shaped figures. Those sheets which constitute the tube for the circulation of fluid are not joined together along the short bases of the trapeziums. Preferably, isosceles trapezium shaped figures have their nonparallel sides curved so that, in operation, the tube for the circulation of fluid possesses a profiled nozzle at each end.

The plastic sheets can be joined together in a leaktight manner by any suitable means, such as, for example, by sticking or by welding, in particular by ultrasonic welding. Advantageously, the sheets are joined together so that an external rim is formed.

The plastic sheet or sheets permeable to solar radiation are preferably made of plastics which simultaneously combine adequate mechanical properties, a good resistance to ageing, a good resistance to ultraviolet and a good heat resistance, whilst at the same time being sufficiently permeable to solar radiation and being flexible as a result of using internal or external plasticisers if appropriate. Adjuvants suitable for improving the resistance to ultraviolet or the heat resistance may, for example, be incorporated into these plastics.

The plastic sheet or sheets can be of the "film" type and may optionally be reinforced, for example with the aid of a network of filaments embedded in the material constituting the sheets; or they can be made of coated fabric.

Plastics which can be used for producing the sheets permeable to solar radiation are polymers or copolymers obtained by the polymerisation of one or more of the following: vinyl monomers, such as vinyl chloride, vinylidene chloride and vinylidene fluoride; alpha-olefines, such as ethylene and propylene; acrylic acid derivatives, such as acrylonitrile, acrylate and methacrylate; polyhalogenated olefines, such as polytetrafluoroethylene; and polyvinylacetals. It is also possible to use polycondensates, such as polyesters, polyamides, polyurethanes, polysiloxane polymers and cellulosic polymers, such as cellulose acetate.

The means for communicating the insulation chamber with the tube for the circulation of fluid comprises at least one opening in the plastic sheet separating them. The opening or openings are located in the first half of the tube for the circulation of fluid, that is to say between the inlet and the middle of the tube; preferably, the opening or openings are located in the vicinity of the inlet of the tube, the distribution of several openings not being critical.

The surface area of one opening, or the sum of their surface areas in the case of several openings, when the collector is in operation, is very small compared with the surface area of the plastic sheet possessing the opening or openings. Thus, the ratio of the surface area of the opening, or of the sum of the surface areas of the openings to the surface area of the plastic sheet is less than 1/10,000 and generally less than 1/20,000.

The opening or openings can be produced by piercing with a punch, by tearing, by cutting with a blade, or by another similar method.

If appropriate, the plastic sheet constituting the external wall of the insulation chamber can comprise, in the region of the outlet of the tube for the circulation of fluid, vent means (such as a valve, hole, slot or the like) which make it possible for the gaseous fluid contained in the insulation chamber to pass to atmosphere. The passage area of the vent means is smaller than the cross-section of the opening, or smaller than the sum of the cross-sections of the openings, ensuring the communication between the insulation chamber and the tube for the circulation of fluid.

To achieve a satisfactory efficiency from a solar energy collector intended for heating a gaseous fluid, it is necessary that, on the one hand, the speed of the gaseous fluid in the tube is not too low so that it is possible to heat a sufficient volume of fluid and that, on the other hand, the residence time of the fluid in the tube is long enough for the increase in the temperature of the fluid to be sufficient. Thus, in order for the user to be able to operate the solar energy collector with a satisfactory efficiency, the collector may also comprise means limiting the average height of the tube for the circulation of fluid.

Advantageously, in order to be able to achieve an optimum efficiency, the means limiting the average height of the tube for the circulation of fluid are such that the ratio of the average height of the said tube to its width is less than 0.20 and preferably less than 0.15.

In the present text, the values for the average height and the width of the tube are given for that zone of the tube where the passage area for the gaseous fluid is approximately constant.

Thus, the term "width" will designate the size of the tube for the circulation of fluid, in this zone, as measured perpendicular to the direction of flow of the fluid and parallel to the surface on which the collector is placed.

The term "mean height" will designate the arithmetic mean in this zone of the distances of the points on the plastic sheet separating the tube for the circulation of fluid and the insulation chamber, to that plastic sheet delimiting the tube which is approximately parallel to the surface on which the collector is placed.

In this zone, the passage area for the gaseous fluid can be of approximately rectangular shape, or it can be in the shape of a curvilinear rectangle, or in the shape of a rectangle, along one length of which a circular sector is joined.

According to a first embodiment of the solar energy collector of the present invention, the means for absorbing the solar energy consist of one of those plastic sheets which delimit the tube for the circulation of gaseous fluid, the said sheet being dark in colour.

Preferably, the dark-coloured plastic sheet has a matt appearance.

The dark-coloured plastic sheet can be the plastic sheet separating the tube for the circulation of fluid and the insulation chamber; preferably, the dark-coloured plastic sheet is that one of the plastic sheets delimiting the tube for the circulation of fluid which is furthest from the insulation chamber.

By circulating in contact with the dark-coloured plastic sheet, the gaseous fluid warms up and conveys the heat due to the solar radiation towards colder zones.

The dark-coloured plastic sheet is advantageously opaque; it can be blue, green, red, black or another dark colour. It is preferably produced using plastics which simultaneously combine adequate mechanical properties, flexibility, a good resistance to ageing, a good resistance to ultraviolet and a good heat resistance. Adjuvants suitable for improving the resistance to ultraviolet or the heat resistance, for example, can be incorporated into these plastics. The plastics used to produce the dark-coloured sheet can be plastics which are similar to those used for the sheets which are permeable to solar radiation, but which contain dyestuffs or pigments, such as carbon black.

The dark-coloured plastic sheet can also be corrugated or rippled. It can also be like a complex blistered film similar to those used for packaging fragile equipment; this is particularly advantageous in the case where the dark-coloured plastic sheet is the sheet closest to the surface on which the collector is to be placed.

The dark-coloured plastic sheet can optionally be reinforced, for example with the aid of a network of polyamide filaments embedded in the material constituting the sheet.

According to this first embodiment, the means limiting the average height of the tube for the circulation of fluid can consist of plastic strips which are joined, at their ends, to the plastic sheets delimiting the said tube, the said strips being approximately perpendicular to the said sheets when a gaseous fluid circulates in the said tube.

The means limiting the average height of the tube for the circulation of fluid can also consist of spacers placed inside the said tube, perpendicular to the direction of flow of the gaseous fluid and approximately parallel to the plastic sheets.

The spacers can have a profile in the shape of a very elongate I placed horizontally, and a length which is such that the tube is stretched transversely, that is to say perpendicular to the direction of flow of the gaseous fluid.

The spacers can be formed of a plastic or metal profile.

According to a second embodiment, the solar energy collector forming the subject of the invention is such that the means for absorbing solar energy consist of an absorbing element located inside the tube for the circulation of gaseous fluid.

If appropriate, according to this second embodiment, the absorbing element consists of at least one assembly comprising a dark-coloured plastic sheet joined to a spacer, the said sheet floating in the gaseous fluid which inflates the tube.

Also, if appropriate, a solar energy collector according to this second embodiment can possess, inside the tube for the circulation of gaseous fluid, an absorbing element which comprises means for the circulation of a liquid fluid suitable for heat exchange with the absorbing element.

An absorbing element of this type can comprise, fixed to one or other of its faces, a tube for the circulation of liquid fluid. The absorbing element can also consist of two heat-conducting sheets fixed face-to-face so as to enclose the tube for the circulation of liquid fluid; an absorbing element such as that described in Belgian Pat. No. 878,040 is particularly suitable.

Preferably, according to this second embodiment, the absorbing element is in the form of a thin plate which also constitutes the means for limiting the average height of the tube for the circulation of fluid.

Preferably, that face of the absorbing element which is exposed to the solar radiation is dark in colour and has a matt appearance. For this purpose, it can be covered or coated with paint, the colour of the covering or paint being, for example, black, green, red or blue. The dark colour and the matt appearance of that face of the absorbing element which is exposed to the solar radiation can be achieved by subjecting the material constituting the absorbing element to chemical erosion.

Preferably, that face of the absorbing element which is not exposed to the solar radiation is light in colour; this face can be polished in the case of an absorbing element made of metal.

A further preference is that the means intended for limiting the height of the tube for the circulation of fluid also make it possible temporarily to reduce the width of the absorbing element during its introduction into the tube; on resuming its initial width, the absorbing element transversely stretches the plastic sheets delimiting the tube.

The means for limiting the height of the tube for the circulation of fluid can consist of a longitudinal bend, of approximately N-shaped profile or zig-zag profile, in the plate.

The function of the absorbing element comprising the means for limiting the height of the tube for the circulation of fluid will be understood more clearly from the following description of various embodiments of absorbing elements, in the form of a plate, placed inside a tube.

Advantageously, the solar energy collector of the present invention also comprises an insulating cushion in contact with the external face of the plastic sheet, which face is not exposed to the sun.

The function of this insulating cushion is, in particular, to ensure good thermal insulation of the collector from the support surface on which the collector is placed.

The insulating cushion can consist of a layer of thermally insulating material, which is fixed, for example by sticking, to the external face of the plastic sheet, which face is not exposed to the sun, or which is only arranged on the support surface before the collector is positioned.

In addition to providing the thermal insulation of the collector from the surface, the layer of thermally insulating material makes it possible to prevent any damage to the collector, caused by the possible non-uniformity of the surface on which the latter is placed.

The thermally insulating layer can be made of a cellular material; suitable materials which may be mentioned include foams or lightened products obtained from polystyrene, polyurethane, polyethylene, polyamide or polyvinyl chloride, which may or may not be plasticised and into which adjuvants suitable for improving the resistance to ultraviolet and/or the heat resistance of the materials, for example can be incorporated.

The thermally-insulating layer can also be made of glass wool or rock wool. If appropriate, it can also be a panel made of wood or a panel made of wood shavings agglomerated with the aid of a binder. The thermally-insulating layer can also consist of a web of a non-woven textile material made of polymer filaments, such as, for example, polyamide, polyester or polyolefine filaments; polymers based on polyester and polypropylene are preferably used.

The non-woven textile materials obtained by direct spinning or melt spinning, of the SPUNBONDED type, which are manufactured by RHONE-POULENC TEXTILE from continuous polyester filaments mechanically joined by needle felting and marketed under the name BIDIM, are particularly suitable.

If appropriate, the non-woven textile material can be impregnated. The impregnating product can be a silicone resin, polyurethane, polyvinyl chloride, neoprene or alternatively bituminous resins.

A thermally-insulating layer made of a non-woven textile material can be coated on one or both of its faces. The coating product can be chosen from the impregnating products; preferably, the coating product may be a polyurethane resin or neoprene.

If appropriate, the insulating cushion can also be similar to the insulation chamber; in that case, it is delimited by a plastic sheet and can be communicated with the tube for the circulation of fluid by at least one opening. In this case, the thermal insulation is achieved by the presence of a layer of gaseous fluid between the plastic sheet of the tube for the circulation of fluid which is not exposed to the solar radiation, and the plastic sheet delimiting the insulating cushion, the two sheets of course being joined together in a leaktight manner along their periphery.

The invention embraces within its scope using together an insulating cushion similar to the insulation chamber, and a layer of thermally insulating material, for example a non-woven textile material, arranged on the support surface before the collector is positioned.

When it is in use, the solar energy collector according to the present invention catches the wind to a large extent. In order to prevent the collector from being uprooted and blown away, it includes suitable effective fixing means.

The means for fixing the solar energy collector to the surface can consist of a system of wires located above the said collector, the said system being anchored to the said support surface.

The system of wires can consist of taut cables or latticework or also netting. The system may be firmly anchored to the support surface either by means of hooks or rings fixed directly to the latter, or by means of pegs which are driven into the support surface and are provided with rings or hooks.

A system of wires of this type constitutes effective fixing means and exhibits the advantage that it prevents excessive inflation of the insulation chamber, which reduces the extent to which the collector catches the wind.

According to a modified embodiment, the means for fixing the solar energy collector to the surface can consist of pegs cooperating with rings or eyelets located along the edges of the said collector, the said pegs being driven into the support surface.

The eyelets can be located in the rims formed during the joining of the plastic sheets constituting the collector.

A solar energy collector in which the fixing means consist of pegs cooperating with rings or eyelets is particularly suitable for mobile applications because it does not require prior preparation of the surface intended to receive the collector, the pegs being driven directly into the ground.

Although reference has been made in the present text to a support surface such as, for example, the surface of the ground or of a terrace or roof, the scope of the invention is not exceeded by fixing the collector to a surface such as defined by a system of taut cables or wire netting, the collector being fixed to the cables or to the netting.

The collector is fixed to the support surface by fixing means which consist of rings or eyelets located along the edges of the collector, and which cooperate with the cables or the netting defining the said support surface.

This method of supporting the collector exhibits the advantage that it can easily be adapted to a support surface which is inclined relative to the actual surface of the ground or of a terrace or roof.

A collector according to the invention for fixing to a support surface of this type will preferably be a collector comprising an insulating cushion.

The present invention also provides a water heater including the above defined solar energy collector. A water heater of this type comprises a heat exchanger having two compartments, the water to be heated passing through the first compartment, a hot gaseous fluid passing through the second compartment, and the said second compartment forming part of a circuit comprising means for the circulation of the fluid through a solar energy collector according to the present invention, which is placed upstream of the said exchanger.

That compartment of the heat exchanger through which the hot gaseous fluid passes can form part of an open circuit, that is to say that the gaseous fluid which leaves the heat exchanger after losing some of its heat is returned directly into the atmosphere or is used, for example, in an air-type heating installation.

Preferably, the water heater is such that the compartment of the heat exchanger through which the gaseous fluid passes forms part of a closed circuit, that is to say that the gaseous fluid leaving the heat exchanger is returned to the inlet of the solar energy collector. This embodiment of the water heater has an improved thermal efficiency.

The present invention also provides a heat pump assisted heating device including the above defined solar energy collector. This heating device in which the heat pump absorbs the thermal energy of the surrounding air is such that the air constituting the cold sink circulates in a circuit comprising a heat exchanger, the heat-exchange fluid passes through the first compartment of the said exchanger, the air passes through the second compartment of the said exchanger, and the said second compartment forms part of a circuit comprising (a) means for the circulation of the air and (b), placed upstream of the said exchanger, a solar energy collector according to the present invention.

Preferably, if the air leaving the second compartment is warmer than the ambient air surrounding the compartment through which the air of the heat exchanger passes, the said second compartment may form part of a closed circuit, that is to say that the air leaving the heat exchanger is returned to the inlet of the solar energy collector. This embodiment of the device further improves the performance coefficient of the heat pump.

The invention will more easily be understood by reference to the description of the accompanying drawings which illustrate, by way of example, schematically and with no fixed scale, various embodiments of solar energy collectors according to the present invention and also of a water heater and a heating device with a heat pump, also according to the present invention.

A first embodiment of a solar energy collector according to the invention, and various modifications of it, are shown in FIGS. 1 to 4.

Figures 1, 2, 3:
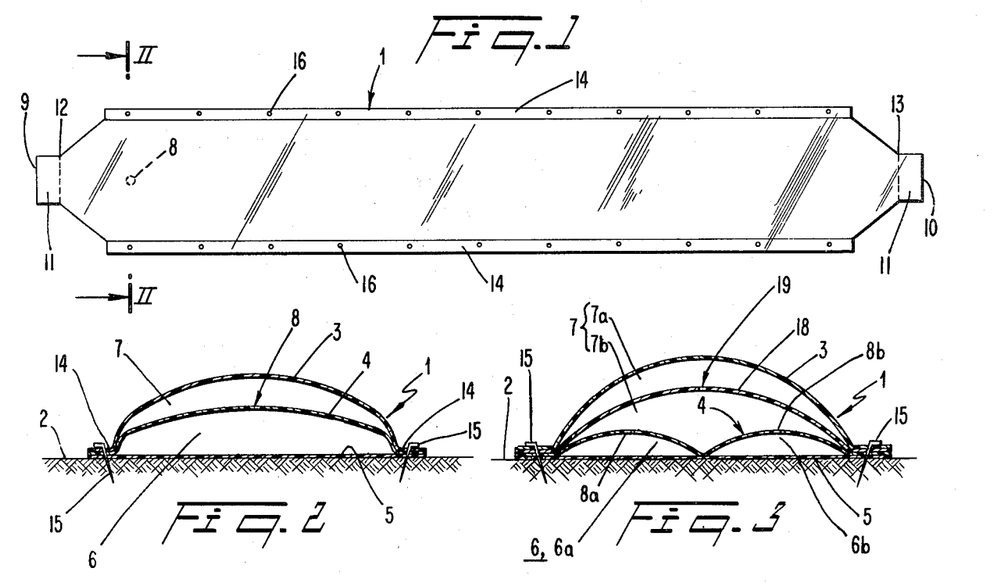
FIG. 1 is a top plan view of a first embodiment of a solar energy collector according to the invention.
FIG. 2 is a view of the collector according to FIG. 1, as a section through a plane II—II perpendicular to the surface on which the collector is placed.
FIGS. 3, 4 and 5 are sectional views, through perpendicular planes similar to the plane II—II, of modifications of solar energy collectors according to this first embodiment.

The solar energy collector (1) is shown in a top plan view in FIG. 1, and is shown in FIG. 2 in its operating configuration. The collector consists of three plastic sheets (3, 4, 5). The sheets (4) and (5) delimit an inner tube for the circulation of gaseous fluid and the sheets (3) and (4) delimit an insulation chamber (7).

The plastic sheets (3, 4, 5) have similar dimensions; they have approximately the shape of an elongate rectangle (FIG. 1), across the width of which (at the ends) are two isosceles trapeziums joined by its long base to the respective ends of the rectangle. The sheets (3, 4) are joined together in a leaktight manner along the whole of their periphery and the sheets (4, 5) are also joined together in a leaktight manner along their periphery except along the short bases of the trapeziums. This leaves open zones (12, 13) in order to provide inlet means (9) and outlet means (10) for the gaseous fluid to pass into and out of the inner tube (6). As shown in FIG. 1, tubular sleeves (11) are welded or stuck to the periphery of the open zones (12, 13) in order to make it possible easily to connect the inlet means (9) and the outlet means (10) of the solar energy collector respectively to an upstream blower and to a downstream use circuit.

The plastic sheets (3, 4, 5) are joined together by welding, so that a rim (14) is formed along the two lengths of the sheets.

The plastic sheet (3) constituting the external wall of the insulation chamber (7) is permeable to solar radiation.

The plastic sheet (4) can also be permeable to solar radiation, in which case the plastic sheet (5) will be dark in colour and have a matt appearance thereby constituting the means for absorbing the solar energy.

If appropriate, the plastic sheet (4) can itself be dark in colour and have a matt appearance and can constitute the means for absorbing the solar energy.

An opening (8) in the sheet (4), located in the region of the inlet of the inner tube, ensures the communication between the inner tube (6) and the insulation chamber (7). The function of this opening (8) will become apparent during the following description of the operation of the collector.

The collector (1) is fixed to a surface (2), on which it is placed, with the aid of pegs (15) passing through eyelets (16), that is to say holes crimped with metal rings, provided in the rims (14). The pegs (15), which are similar to tent pegs, are driven into the support surface (2), for example the ground, on which the solar energy collector is to be placed.

Before inflation, a solar energy collector of this type is approximately flat and can easily be rolled up because it is made of sheets of flexible plastic. The manner in which this solar energy collector is brought into service, and its operation, are described below.

The collector is transported to the location of use in the form of a roll. After the surface of the ground intended to receive the collector has been prepared, for example by flattening and, if appropriate, spreading a bed of sand or gravel, the collector is unrolled. If appropriate, before the collector is unrolled, an insulating cushion consisting for example of a web of non-woven textile material can be placed on the surface.

The collector is fixed to the ground surface by means of the pegs (15) which pass through the eyelets (16) and are driven into the ground.

The inlet means (9) of the solar energy collector are connected to a blower and the outlet means (10) are connected to a use circuit for the heated fluid, which is most frequently air.

The motor of the blower is started up and the air to be heated enters the inner tube (6) for the circulation of fluid, and thereby inflates it. Virtually simultaneously, air enters the insulation chamber (7) through the opening (8) in the sheet (4) and causes the insulation chamber to inflate also. The pressure of the air contained in the insulation chamber (7) and the pressure of the air circulating in the circulation tube (6) are approximately equal.

The air which circulates in the tube (6) warms up in contact with the dark-coloured plastic sheet (5), which acts as an absorber of radiant heat, and leaves the tube (6) through the outlet (10) from which the heated air is directed towards the use circuit.

The above account relates to the operation of the solar energy collector according to the invention both during the starting-up of the air-heating installation and under steady running conditions. Moreover, the flow rate of the air in the tube can decrease substantially during malfunctions or can even be zero during breakdowns or shutdowns, and it is under the conditions of low air flow rates or zero flow rates that the risks of destruction of the prior art solar energy collector, by overheating, are significant.

The following description of the operation of the solar energy collector according to the present invention during a substantial reduction in the air flow rate clearly shows one of the advantages of the collector according to the present invention, compared with the prior art collectors.

Since the pressure of the air in the inner circulation tube (6) is a function of the output of the blower, a decrease in the air flow rate in the tube (6) causes greater heating of the circulation air and runs the risk of damaging the plastic sheets (4) and (5), but this decrease in the air flow rate also causes a decrease in the pressure in the inner tube (6) and, because of the presence of the opening (8), a corresponding decrease in the pressure in the insulation chamber (7), which thus becomes less inflated and consequently a less efficient thermal insulator for the inner tube (6). The heat losses, towards the outside, from the air circulating in the tube (6) are then greater and the risks of overheating are virtually eliminated, as are also the risks of damaging the solar energy collector.

The use and the operation of the collector have been described above with reference to the first embodiment of the solar energy collector according to the present invention. Various modifications and other embodiments described below are used and operated in an identical manner.

One modification of this first embodiment of the solar energy collector according to the invention is shown in FIG. 3, in section through a plane similar to the plane II—II. This collector is similar to the collector described above, but the plastic sheets (4) and (5) delimiting the inner tube for the circulation of fluid are also joined together at (17), for example by welding, along a line parallel to the length of the collector, along the length of the tube (6) apart from in the region of the inlet and outlet means for the gaseous fluid. The gaseous fluid is thus divided up and circulates in the central zone of the collector (1a) in a tube (6) formed of two approximately parallel elementary tubes (6a) and (6b), these two flows of gaseous fluid coming together near the outlet of the collector. In that case, the sheet (4) has two openings (8a) and (8b), which bring the two elementary tubes (6a) and (6b) into communication with the insulation chamber (7).

According to this modification, the insulation chamber (7) is itself partitioned by a plastic sheet (18) which is permeable to solar radiation. This sheet (18) is joined to the sheet (4) in a manner similar to the sheet (3) defining the exterior of the insulation chamber (7). It can have a lower thickness than the sheet (3) because it is not subjected to external influences such as abrasion. The sheet (18) thus partitions the insulation chamber (7) into two compartments (7a) and (7b) thereby reducing the convection currents inside the insulation chamber (7) and reduces the heat losses. The sheet (18) has at least one opening (19), bringing the compartments (7a) and (7b) of the insulation chamber into communication with one another.

Figure 4:
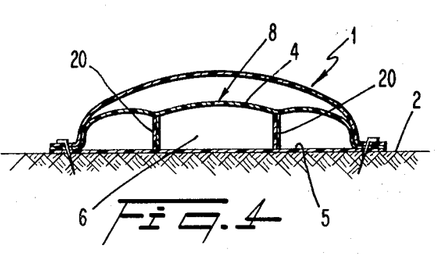

Another modification of the first embodiment of the solar energy collector according to the invention is shown in FIG. 4, in section through a plane similar to the plane II—II.

The solar energy collector according to this modification is similar to the collector shown in FIGS. 1 and 2 but, in order to improve its efficiency, it comprises means limiting the height of the inner tube for the circulation of fluid.

This collector (1c) comprises short plastic strips (20) which are joined at their ends, for example by welding or by adhesives, to the plastic sheets (4, 5) delimiting the inner tube (6) for the circulation of fluid. The length of these strips (20) is such that they limit the inflation of the inner tube (6) upwards, so that the ratio of the average height of the tube to its width is less than 0.20 and even leess than 0.15.

The strips (20) are generally uniformly distributed along the length and/or the width of the inner tube (6) and in the inflated condition of the inner tube (6) are approximately perpendicular to the plastic sheets (4, 5) delimiting the tube.

Figure 5:
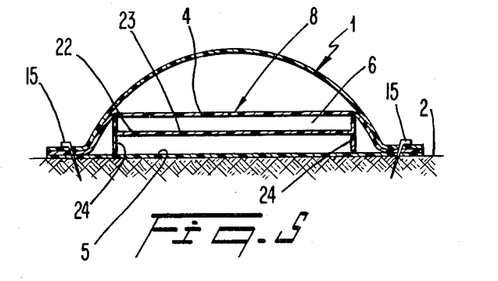

Yet another modification of the solar energy collector according to this first embodiment is shown in FIG. 5.

This collector 1d is similar to the collector shown in FIGS. 1 and 2; in this case, the means for limiting the height of the tube for the circulation of fluid consist of spacers (22) which have a profile in the shape of a very elongate I and which are placed inside the tube (6), perpendicular to the direction of flow of the gaseous fluid with the stem (23) of the I approximately parallel to the plastic sheets (4, 5) which delimit the inner tube (6). The dimension of the I measured along the direction of flow of the gaseous fluid is small compared with the length of the I, that is to say the length of its stem.

The height of the crosspiece (24) of the I is such that the plastic sheets (4, 5) are transversely stretched by the I. In operation of the collector, the average height of the tube (6) for the circulation of fluid will be approximately equal to the height of the individual crosspieces of the I.

Figure 6:
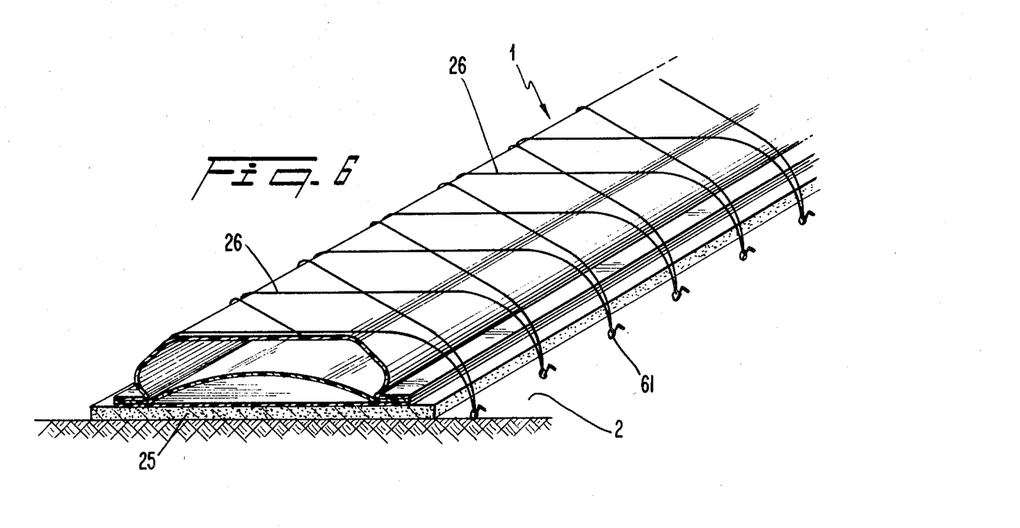
FIG. 6 shows another method of fixing a solar energy collector according to the invention.

A further variation of the first embodiment of solar energy collector (1) is shown in FIG. 6 and is placed on an insulating cushion (25) comprising a layer of thermally insulating material. The means of fixing to the support surface (2) consist of a system of wires or threads (26) located above the collector (1), and the system of wires (26) is anchored to the support surface by means of rings (61) fixed to the support surface (2).

The system of wires can consist of taut wires, as shown, or alternatively the system of wires can be in the form of latticework, or a screen, or netting. The system of wires can be anchored directly to rings, as shown, or to hooks fixed to pegs driven into the support surface. The support surface itself may for example, be a latticework, or netting.

If desired the insulating cushion may itself be an inflated chamber similar in construction to the insulation chamber (7) and communicated with the inner tube (6) by at least one aperture.

Figure 7:
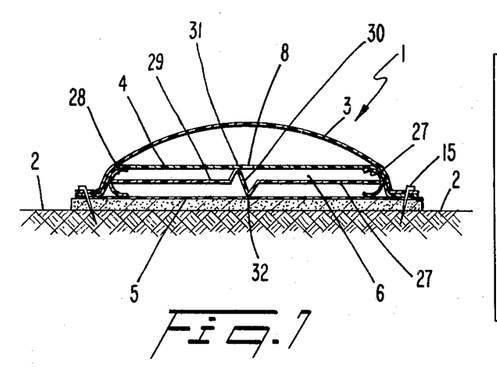
FIG. 7 is a sectional view, through a plane similar to the plane 11—11, of a second embodiment of a solar energy collector according to the invention.

A second embodiment of solar energy collector (1e) shown in section in FIG. 7 comprises solar energy absorbing means which consist of a radiant heat absorbing element (27) which is located inside the inner tube for the circulation of gaseous fluid, and which also constitutes the means for limiting the height of the inner tube for the circulation of fluid.

As shown in FIG. 7, the absorbing element (27) consists of two longitudinal channels (28) in the form of circular arcs, which are connected by a plate (29) comprising, in its median zone, a longitudinal bend (30), the profile of which is approximately in the shape of a letter N.

The longitudinal channels (28) and the N-bend of the radiant heat absorbing element (27) on the one hand serve to keep apart the plastic sheets (4, 5) delimiting the inner tube (6), and on the other hand make it possible to stretch these sheets transversely, which makes it possible to limit the height of the tube (6) in a manner similar to the spacers used with the first embodiment described above.

Since the plastic sheets (4) and (5) are kept away from the two faces of the radiant heat absorbing element (27), the gaseous fluid circulates in the tube (6) in contact with these two faces, and this favours the heat exchange between the gaseous fluid and the radiant heat-absorbing element.

The radiant heat-absorbing element can be formed as a solid plate, that is to say a plate which does not have holes passing right through it. It can also have holes or slots, for example formed as air scoops, which make it possible to mix the gaseous fluid flows located on either side of the absorbing element.

The dimensions of the longitudinal channels (28) and of the N-bend (30) measured perpendicular to the surface (2) on which the collector (1) is placed, and also the size of the radiant heat absorbing element measured parallel to this surface (2), are chosen so that the plastic sheets (4, 5) delimiting the inner tube (6) for the circulation of fluid are transversely stretched whilst bearing on the channels (28) and on the tips (31, 32) of the N-bend.

The radiant heat-absorbing element (27) can be made of various materials, in particular plastic; it is preferably made of metal. The thickness of the plate (29) constituting the absorbing element (27) is chosen so that the N-shaped bend can be deformed by hand, by means of a compressive action exerted transversely on the channels (28), in order to make it possible temporarily to reduce the width of the heat-absorbing element (27) so that it can be introduced more easily into the inner tube (6).

Figure 8:
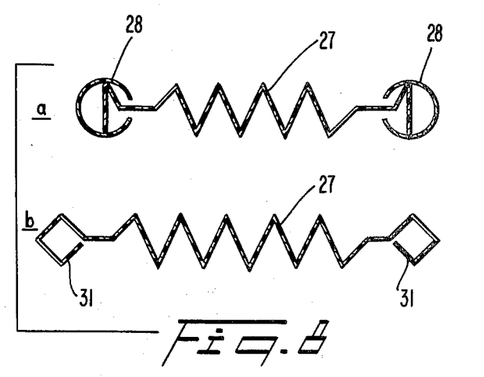
FIGS. 8a and 8b are cross-sections of other embodiments of absorbing elements intended for a collector forming the subject of the present invention.

The heat-absorbing elements (27a, 27b) of the embodiments shown in FIGS. 8a and 8b consist of a plate comprising a bend, which is of zig-zag form in transverse section.

The heat-absorbing element (27a) shown in FIG. 8a also comprises longitudinal channels (28). The heat-absorbing element (27b) shown in FIG. 8b does not comprise such longitudinal channels but instead has a bent flange (31) formed by the plate constituting the heat-absorbing element (27).

Figure 9:
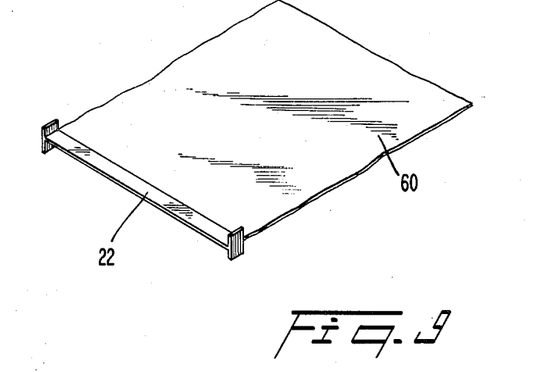
FIG. 9 is a perspective view of another embodiment of part of an absorbing element.

Part of another embodiment of a radiant heat-absorbing element intended for a solar energy collector according to the invention is shown in FIG. 9. In this embodiment, a heat-absorbing element consists of at least one assembly such as shown in FIG. 9. An assembly of this type consists of an approximately rectangular sheet (60) of dark-coloured plastic, which is joined to a spacer (22a) having the shape of a very elongate I such as described above.

The assembly consisting of the sheet (60) and the spacer (22a) is introduced into the inner tube (6), the sheet (60) floating in the stream of gaseous fluid when the collector is in operation.

Several separate assemblies, of a type such as those described, can be introduced into the inner tube for the circulation of fluid in which case they are advantageously connected to one another, for example by means of a small cord.

Although the invention has been described above with more particular reference to a collector in which the inner tube, for the circulation of gaseous fluid, is approximately rectilinear the scope of the invention embraces producing a collector in which the inner tube for the circulation of gaseous fluid is U-shaped so the inlet and outlet means are adjacent one another. This constitutes a third embodiment of the invention and a solar energy collector of this type is shown in FIGS. 10 and 11.

Figure 10:
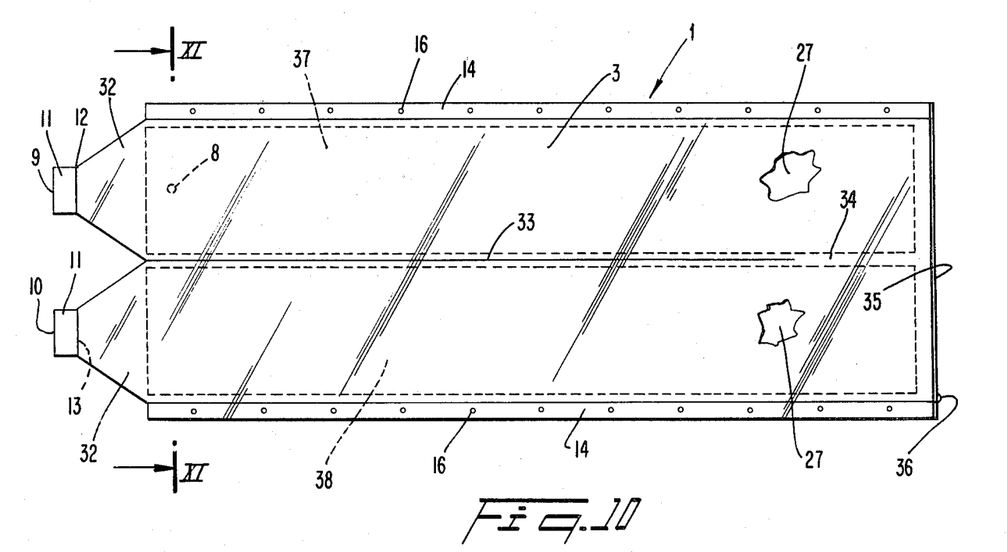
FIG. 10 is a top plan view of a third embodiment of a solar energy collector according to the present invention.
Figure 11:
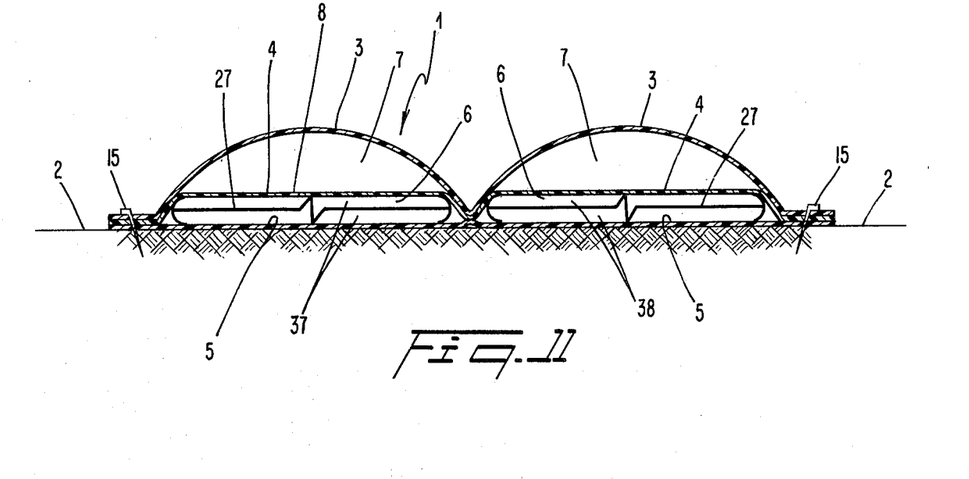
FIG. 11 is a section, through a plane XI—XI perpendicular to the surface of the ground, of a solar energy collector according to FIG. 10.

FIG. 10 is a top plan view of the collector at rest, and FIG. 11 is a view of the collector in operation, taken as a section on a plane XI—XI perpendicular to the surface on which the collector is placed.

In this third embodiment, the collector (1f) is formed of three plastic sheets (3', 4', 5') which are joined together so that the sheets (4') and (5') delimit the inner tube (6') and so that the sheets (3') and (4') delimit the insulation chamber (7').

The plastic sheets (3', 4', 5') have similar dimensions; they approximately have the shape of a rectangle with one of the shorter sides joined to the long base of one of two isosceles rectangular trapeziums (32).

The sheets (3') and (4') are joined together in a leaktight manner along the whose of their periphery and also along a part (33) of the median of the rectangle, leaving the sheets (3') and (4') separated in the zone (34).

The sheets (4') and (5') are also joined together in a leaktight manner along their periphery, along the width (35) of the rectangle, and along the part (33) of the median of the rectangle, but not along the short bases of the trapeziums (32), (thus leaving open zones (12, 13) for inlet and outlet means).

The inlet means (9') and outlet means (10) for the gaseous fluid to pass into and out of the tube (6') through the open zones (12', 13') comprise tubular sleeves (11') stuck or welded to the periphery of the open zones (12', 13').

Along the width (35) of the rectangle, the sheets (4') and (5') are joined together in a leaktight but detachable manner such that the sheets (4') and (5') can be separated. For this purpose, the sheets (4') and (5') are preferably joined together along the width (35) by means of releasable connecting devices (36) which make it possible to connect the sheets (4') and (5') in a leaktight manner as desired, it being possible for these releasable devices (36) to be staples, pressstuds or sliding closures. The function of this connecting device will become apparent below.

The solar energy collector produced in this way thus comprises a U-shaped inner tube (6') which has an inlet branch (37) and an outlet branch (38), the branches being connected at the zone (34) by a passage. The collector also has its insulation chamber (7') U-shaped.

An opening (8') in the sheet (4'), located in the inlet branch (37) of the inner tube (6'), and preferably in the vicinity of the inlet (9') of the tube (6'), ensures communication between the inner tube (6') and the insulation chamber (7'). The function of this opening (8') has been described above with reference to the first embodiment.

In the collector shown in FIGS. 10 and 11, the means for absorbing the solar energy consists of an absorbing element (27') which is located in the inner tube (6') and is similar to those described previously but is produced in two parts, each of which is slid into one of the branches of the U formed by the tube (6'). The two parts of the absorbing element (27) are easily introduced into the tube (6') by separating the sheets (4') and (5') along the width (35) by means of the releasable connecting device (36).

Along the length of the rectangle, the sheets (3', 4', 5') are joined together to form a rim (14') which includes eyelets (16'), used for fixing the collector (1f) to the surface (2) on which the collector is placed.

The solar energy collector shown in FIGS. 10 and 11 comprises plastic sheets (3') and (4') which are permeable to solar radiation.

The tube for the circulation of gaseous fluid may be in the shape of a U in which there is no radiant heat-absorbing element, but where the means for absorbing the solar energy consists of the sheet (5'), now dark in colour. A collector of this type is similar to the collector of the first embodiment described above. This type of collector need not comprise a connecting device (36) along the width (35) of the rectangle, in which case the sheets (4') and (5') are joined together in a leaktight manner, for example by welding or sticking.

The various embodiments of the solar energy collector according to the invention, and their modifications, have been described above by way of example, and the scope of the present invention is not exceeded by combining these embodiments and/or modifications with one another.

The solar energy collectors according to the various embodiments and their modifications can be used in the construction of a water heater, or for the construction of a heating device with a heat pump where the said heat pump absorbs the thermal energy of the surrounding air and its performance coefficient is substantially improved.

Figure 12:
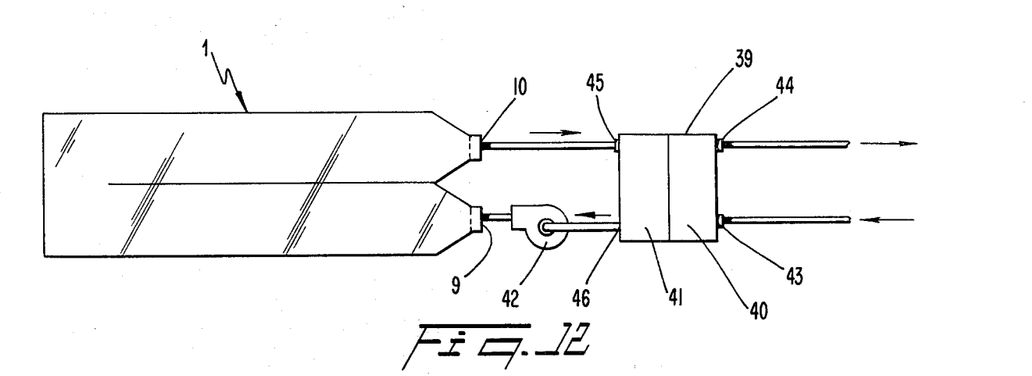
FIG. 12 is a schematic diagram of a water heater containing a solar energy collector according to the invention.

Such a water heater, according to the invention, is shown schematically in FIG. 12 and mainly comprises a heat exchanger (39), a solar energy collector (1f) in accordance with the present invention, and means (42) for the circulation of the gaseous fluid.

The heat exchanger (39) has two compartments (40) and (41) which are each provided with inlet means and outlet means for a heat-transfer fluid.

For this purpose, the first compartment (40) is provided with an inlet (43) for the water to be heated and an outlet (44) for the water when heated.

A gaseous heat-transfer fluid passes through the second compartment (41) and for this purpose the compartment is provided with an inlet (45) for the hot gaseous fluid and outlet (46) for the gaseous fluid after heat exchange with the water circulating in the first compartment (40).

The second compartment (41) of the heat exchanger (39) forms part of a closed circuit which comprises the means (42) for the circulation of the gaseous fluid, for example a fan, and a solar energy collector, e.g., (1f) according to the invention placed upstream of the exchanger (39). The outlet (46) of the second compartment (41) of the heat exchanger (39) is connected to the inlet (9') of the collector (1f) via the circulation means (42). The outlet (10') of the collector (1f) is connected directly to the inlet (45) of the second compartment (41).

At (45), the air which has been heated in the solar energy collector (1f) enters the second compartment (41) of the heat exchanger (39) where it gives up its heat to the water circulating in the first compartment (40) of the heat exchanger; the thus heated hot water leaves this first compartment at (44) and is directed towards the use circuit.

The cooled air leaves the second compartment (41) at (46) and is recycled to the inlet (9') of the collector (1f) by means (42) for the circulation of the air.

Figure 13:
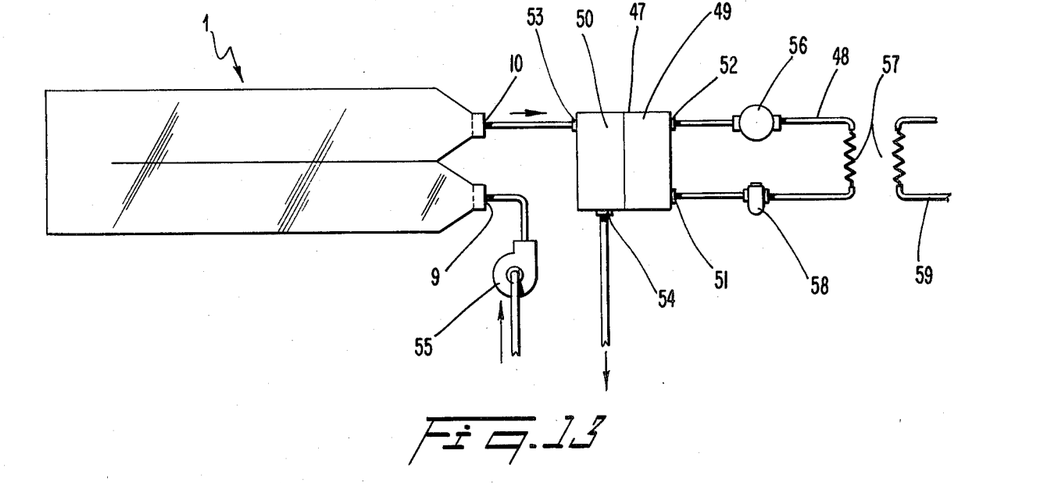
FIG. 13 is a simplified diagram of a heating device with a heat pump, containing a solar energy collector according to the invention.

A heating device including a heat pump to absorb the thermal energy of the surrounding air is shown schematically in FIG. 13, and mainly comprises a heat exchanger (47), the heat-exchange fluid of a heat pump (48) passing through one of the compartments (49) of the said heat exchanger, and the air previously heated in the collector, e.g., (1f) passing through the other compartment (50).

The heat exchanger (47) thus comprises the first compartment (49), forming part of the heat pump (48) and provided with an inlet (51) and outlet (52) for the heat-exchange fluid, and the second compartment (50) which is provided with an inlet (53) and outlet (54) for the air.

The second compartment (50) of the heat exchanger (47) forms part of a circuit which comprises means (55) for the circulation of the air, such as a fan, and a solar energy collector (1f) according to the invention placed upstream of the exchanger (47).

The circuit containing the heat-exchange fluid of the heat pump consists of a compressor (56), a condenser (57) for the heat-exchange fluid, a relief valve (58) for the heat-exchange fluid, and an evaporator which, in this case, is the first compartment (49) of the heat exchanger (47).

The heat pump (48) of the heating device thus takes heat from the medium in contact with the evaporator (49), namely from the air circulating in the second compartment (50) of the heat exchanger after having been pre-heated in the solar energy collector (1f). The heat pump (48) transmits this heat via the condenser (57) to the use circuit (59). Since the temperature of the air in contact with the evaporator (49) has been raised by the prior circulation of the air in the solar energy collector (1f) according to the present invention, the temperature difference between the hot source (59) and the cold sink (49) is reduced and the performance coefficient of the heat pump (48) is consequently increased.

In FIG. 13, the air is taken in for atmosphere, by the fan (55) and vented to atmosphere after passing through the solar energy collector (1f) and chamber (50). However, if appropriate, the second compartment (50) of the heat exchanger (51) can form part of a closed circuit in which case its outlet (54) will be connected to the inlet of the solar energy collector (1f), the air being recycled by the fan (55).

According to these two embodiments of the heating device according to the invention, it is advantageous (a) to provide an automatically controlled cold air inlet in the circuit through which the air passes, or (b) to recycle directly to the inlet of the compartment through which the air passes a part of the air leaving the said compartment, so that the temperature of the air in contact with the evaporator (49) is not too high and the heat pump can operate under the optimum conditions, that is to say with a temperature difference of the order of 20° C. between the hot source and the cold sink (59).

A heating device of this type is particularly valuable for use in winter. In fact, on the one hand the weak sunshine of this season does not always make it possible, with the aid of a solar energy collector, to heat the external cold air to a sufficient temperature for it to be used directly in a heating installation (as in FIG. 12), and on the other hand the very low temperature of the external air requires a heat pump to operate with a temperature difference between the hot source and the cold sink which is much too large for the performance coefficient of the heat pump to be suitable.

Figure 14:
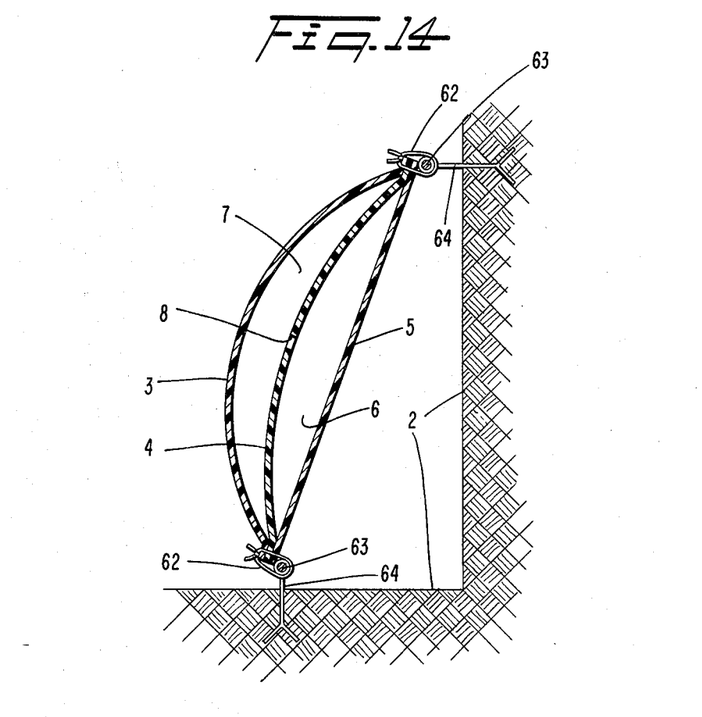
FIG. 14 is a sectional view of a collector which depicts another method of fixing a solar energy collector according to the invention.

As depicted in FIG. 14, the solar energy collector of the present invention comprised of plastic sheets (3, 4, 5) may be attached to a suitable supporting surface (2) by means of rings (62) which cooperate with cables (63) and cable supports (64).

Figure 15:
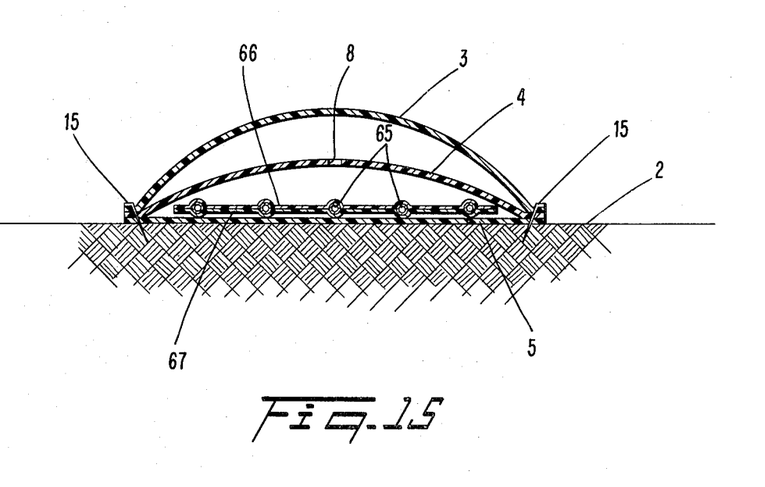
FIG. 15 is a sectional view of a collector which depicts an embodiment of an absorbing element.

FIG. 15 depicts another embodiment of an absorbing element which consists of tubes (65) for circulation of a liquid transfer fluid. The tubes (65) are desirably sandwiched between plastic sheets (66, 67).

The solar energy collector of this invention exhibits numerous advantages compared with the prior art collectors. The solar energy collector according to the invention is of simple design and can readily be transported because it can easily be rolled up.

A significant advantage of the collector of the present invention is that risks of damage to its constituent plastic sheets, by overheating, are virtually eliminated by virtue of the communication existing between the insulation chamber and the inner tube where the gaseous fluid circulates, the inflation and the deflation of the insulation chamber being linked to the circulation pressure of the gaseous fluid in the tube.

Furthermore, as shown, a solar energy collector of this type is advantageously used for the construction of a water heater, and a heat pump assisted heating device, having a high performance coefficient.

I claim:

1. A water heater, comprising a heat exchanger having a first compartment through which water to be heated is passed, and a second compartment through which a hot gaseous fluid is passed; means defining a circuit for the circulation of the fluid through said second compartment; and, in said circuit upstream of the said heat exchanger, a solar energy collector comprising at least three plastic sheets joined together so as to delimit a tube having inlet and outlet means for the circulation of the gaseous heat transfer fluid, and an insulation chamber on said tube, and wherein at least that sheet which constitutes an external wall of said chamber is permeable to solar radiation and further comprising means for absorbing solar energy arranged to contact the gaseous fluid circulated through said tube, means limiting the mean height of said tube, means communicating said insulation chamber with said tube for the circulation of gaseous fluid therebetween and means for fixing said collector to a support surface.

2. A water heater according to claim 1, wherein said circuit for the circulation of the fluid is a closed circuit.

3. In a solar energy collector for heating a gaseous fluid, said collector comprising at least three plastic sheets joined together so as to delimit a tube and an insulation chamber adjacent said tube, said insulation chamber defined by a sheet which constitutes an external wall thereof and one of said sheets of said tube, wherein at least said sheet which constitutes an external wall of said chamber is permeable to solar radiation and wherein said tube includes inlet and outlet means for the circulation of a gaseous heat transfer fluid, the improvement comprising:

means for absorbing solar energy arranged to contact the gaseous fluid circulated through said tube which also serves as means limiting the mean height of said tube, said means comprising a thin plate which includes means defining a longitudinal bend, the profile of which is approximately N-shaped;

means communicating said insulation chamber with said tube for the circulation of gaseous fluid therebetween, said means comprising at least one opening in said one of said sheets of said tube; and means for fixing the said collector to a support surface.

4. A solar energy collector according to claim 3, wherein, when inflated, said tube has a value for the ratio of the mean height of the said tube to its width which is less than 0.20.

5. A solar energy collector according to claim 3, wherein the means for absorbing solar energy comprises one of the plastic sheets delimiting said tube, said sheet being dark in colour.

6. A solar energy collector according to claim 3, and further including an insulating cushion in contact with the external face of the plastic sheet which, in use, is not exposed to the sun.

7. A heating device including a heat pump to absorb the thermal energy of the surrounding environment, a heat exchanger having a first compartment connected to the heat pump and a second compartment in heat exchange relation with said first compartment, means introducing air to said second compartment of the exchanger, and means effective to pass a heat-exchange fluid through said first compartment of the heat exchanger and through said heat pump, wherein said means introducing air to the said second compartment of said exchanger includes a solar energy collector comprising at least three plastic sheets joined together so as to delimit a tube having inlet and outlet means for the circulation of the air heat transfer fluid, and an insulation chamber on said tube, and wherein at least that sheet which constitutes an external wall of said chamber is permeable to solar radiation and further comprising means for absorbing solar energy arranged to contact the gaseous fluid circulated through said tube, means limiting the mean height of said tube, means communicating said insulation chamber with said tube for the circulation of gaseous fluid therebetween, and means for fixing said collector to a support surface.

8. A heating device according to claim 7, wherein said means for introducing air to said second compartment of the heat exchanger comprises a closed circuit including said solar energy collector.

9. In a solar energy collector for heating a gaseous fluid, said collector comprising at least three plastic sheets joined together so as to delimit a tube and an insulation chamber adjacent said tube, said insulation chamber defined by a sheet which constitutes an external wall thereof and one of said sheets of said tube, wherein at least said sheet which constitutes an external wall of said chamber is permeable to solar radiation and wherein said tube includes inlet and outlet means for the circulation of a gaseous heat transfer fluid, the improvement comprising:

means for absorbing solar energy arranged to contact the gaseous fluid circulated through said tube which also serves as means limiting the mean height of said tube, said means comprising a thin plate which includes means defining a longitudinal bend, the profile of which is in zig-zag form;

means communicating said insulation chamber with said tube for the circulation of gaseous fluid therebetween, said means comprising at least one opening in said one of said sheets of said tube; and means for fixing the said collector to a support surface.

10. A solar energy collector according to claim 9, wherein, when inflated, said tube has a value for the ratio of the mean height of the said tube to its width which is less than 0.20.

11. A solar energy collector according to claim 9, wherein the means for absorbing solar energy comprises one of the plastic sheets delimiting said tube, said sheet being dark in color.

12. A solar energy collector according to claim 9, and further including an insulating cushion in contact with the external face of the plastic sheet which, in use, is not exposed to the sun.

13. In a solar energy collector for heating a gaseous fluid, said collector comprising at least three plastic sheets joined together so as to delimit a tube and an insulation chamber adjacent said tube, said insulation chamber defined by a sheet which constitutes an external wall thereof and one of said sheets of said tube, wherein at least said sheet which constitutes an external wall of said chamber is permeable to solar radiation and wherein said tube includes inlet and outlet means for the circulation of a gaseous heat transfer fluid, the improvement comprising:

means for absorbing solar energy arranged to contact the gaseous fluid circulated through said tube;

means limiting the mean height of said tube;

means communicating said insulation chamber with said tube for the circulation of gaseous fluid therebetween, said means comprising at least one opening in said one of said sheets of said tube; and means for fixing the said collector to a support surface; and wherein the means limiting the mean height of the tube comprises spacers which are placed inside said tube and arranged perpendicular to the direction of flow of gaseous fluid therein and approximately parallel to the plastic sheets which delimit the tube and wherein said means for absorbing solar energy comprises at least one assembly comprising a dark-colored plastic sheet joined to a spacer, said dark-colored plastic sheet being arranged to float in the gaseous fluid inflating said tube.

14. A solar energy collector according to claim 13, wherein, when inflated, said tube has a value for the ratio of the mean height of the said tube to its width which is less than 0.20.

15. A solar energy collector according to claim 13, and further including an insulating cushion in contact with the external face of the plastic sheet which, in use, is not exposed to the sun.

* * * * *